United States Patent
Beier et al.

(10) Patent No.: US 11,797,570 B2
(45) Date of Patent: Oct. 24, 2023

(54) ASYNCHRONOUS PERSISTENCY OF REPLICATED DATA CHANGES IN A DATABASE ACCELERATOR

(71) Applicant: INTERNATIONAL BUSINESS MACHINES CORPORATION, Armonk, NY (US)

(72) Inventors: Felix Beier, Haigerloch (DE); Dennis Butterstein, Stuttgart (DE); Einar Lueck, Filderstadt (DE); Sabine Perathoner-Tschaffler, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/206,240

(22) Filed: Mar. 19, 2021

(65) Prior Publication Data
US 2022/0300530 A1    Sep. 22, 2022

(51) Int. Cl.
 *G06F 16/27* (2019.01)
 *G06F 11/14* (2006.01)
 *G06F 16/22* (2019.01)
 *G06F 16/28* (2019.01)

(52) U.S. Cl.
 CPC ........ *G06F 16/273* (2019.01); *G06F 11/1446* (2013.01); *G06F 16/221* (2019.01); *G06F 16/284* (2019.01); *G06F 2201/80* (2013.01)

(58) Field of Classification Search
 CPC .................................................. G06F 16/273
 USPC ........................................................ 707/610
 See application file for complete search history.

(56) References Cited

U.S. PATENT DOCUMENTS

| | | | |
|---|---|---|---|
| 5,721,914 A | 2/1998 | Devries |
| 6,029,178 A | 2/2000 | Martin |
| 6,205,449 B1 | 3/2001 | Rastogi |
| 6,226,651 B1 | 5/2001 | Masuda |

(Continued)

FOREIGN PATENT DOCUMENTS

| | | | |
|---|---|---|---|
| CN | 106294713 A | 1/2017 |
| CN | 106815275 A | 6/2017 |

(Continued)

OTHER PUBLICATIONS

IBM, List of IBM Patents or Patent Applications Treated as Related, Appendix P, dated Mar. 23, 2021, 2 pages.

(Continued)

*Primary Examiner* — Syling Yen
(74) *Attorney, Agent, or Firm* — Anthony Curro

(57) ABSTRACT

A computer-implemented method for a crash recovery for linked databases may be provided. The linked databases comprise a source and related target database. Selected queries of the source database are transferred to the target database. The method comprises synchronizing selected portions of the source database with tables of an in-memory portion of target database and, storing persistently applied changes to the in-memory target database portion asynchronously and persistently. Upon a database crash of the target database system, the method also comprises restoring, the in-memory target database portion with the latest snapshot available, and applying, changes from the source database recovery log file that have a later timestamp than the latest snapshot available in the persistent target database storage of the in-memory target database portion.

23 Claims, 8 Drawing Sheets

(56) References Cited

U.S. PATENT DOCUMENTS

| | | | |
|---|---|---|---|
| 7,287,043 | B2 | 10/2007 | Lindsay |
| 8,996,458 | B2 | 3/2015 | Shang |
| 9,141,670 | B2 | 9/2015 | Branscome |
| 9,442,995 | B2 | 9/2016 | Pareek |
| 9,659,077 | B2 | 5/2017 | Chen |
| 9,672,113 | B1 | 6/2017 | Rodriques |
| 10,261,865 | B1* | 4/2019 | Bajaj ............... G06F 11/1451 |
| 10,275,507 | B2 | 4/2019 | Hrle |
| 10,339,013 | B2 | 7/2019 | Chainani |
| 10,540,346 | B2 | 1/2020 | Martin |
| 10,657,128 | B2 | 5/2020 | Beier |
| 10,698,883 | B2 | 6/2020 | Beier |
| 10,929,428 | B1 | 2/2021 | Brahmadesam |
| 11,061,910 | B1* | 7/2021 | Kondiles ......... G06F 16/24568 |
| 2005/0193024 | A1 | 9/2005 | Beyer |
| 2009/0319550 | A1 | 12/2009 | Shau |
| 2011/0066803 | A1* | 3/2011 | Arakawa ............ G06F 11/2094 |
| | | | 711/E12.019 |
| 2013/0085999 | A1 | 4/2013 | Tung |
| 2013/0159249 | A1 | 6/2013 | Dewall |
| 2013/0305083 | A1* | 11/2013 | Machida ................ G06F 11/30 |
| | | | 714/4.1 |
| 2014/0114924 | A1 | 4/2014 | Abed |
| 2014/0258777 | A1* | 9/2014 | Cheriton ............. G06F 11/141 |
| | | | 714/19 |
| 2014/0279930 | A1 | 9/2014 | Gupta |
| 2015/0006707 | A1* | 1/2015 | Malik ................ G06F 16/1824 |
| | | | 709/224 |
| 2015/0205853 | A1 | 7/2015 | Ngo |
| 2015/0293820 | A1 | 10/2015 | Doshi |
| 2017/0185645 | A1 | 6/2017 | Agarwal |
| 2017/0255528 | A1 | 9/2017 | Kedia |
| 2018/0046693 | A1* | 2/2018 | Brodt ..................... G06F 16/273 |
| 2018/0137187 | A1 | 5/2018 | Brodt |
| 2018/0150504 | A1* | 5/2018 | Lee ..................... G06F 16/2358 |
| 2018/0253483 | A1 | 9/2018 | Lee |
| 2018/0349458 | A1 | 12/2018 | Guirguis |
| 2019/0251198 | A1 | 8/2019 | Shamsutdinov |
| 2020/0026714 | A1 | 1/2020 | Brodt |
| 2020/0034251 | A1 | 1/2020 | Antonopoulos |
| 2020/0034365 | A1 | 1/2020 | Martin |

FOREIGN PATENT DOCUMENTS

| | | |
|---|---|---|
| CN | 104239476 A | 9/2018 |
| CN | 110647579 A | 1/2020 |
| CN | 108052681 A | 5/2020 |
| CN | 112470130 A | 3/2021 |
| EP | 2562657 B1 | 10/2018 |

OTHER PUBLICATIONS

Pending U.S. Appl. No. 17/206,221, filed Mar. 19, 2021, entitled, "Volatile Database Caching in a Database Accelerator," 30 pages.

Ballard et al., "Smarter Business Dynamic Information with IBM InfoSphere Data Replication CDC," Mar. 2012, 484 pages, <http://www.redbooks.ibm.com/redbooks/pdfs/sg247941.pdf>.

Becker, et al., "IBM DB2 Analytics Accelerator High Availability and Disaster Recovery," 2014, pp. 1-40, <http://www.redbooks.ibm.com/redpapers/pdfs/redp5104.pdf>.

Disclosed Anonymously, "A log merge method in active-active sites," IP.Com No. IPCOM000254082D, May 31, 2018, 6 pages.

Disclosed Anonymously, "Data Recovery depending on the index segment," IP.Com No. IPCOM000241553D, May 11, 2015, 4 pages.

IBM, "Acid Properties of transactions," [accessed Oct. 21, 2020], 1 page, <https://www.ibm.com/support/knowledgecenter/en/SSGMCP_5.4.0/product-overview/acid.html>.

IBM, "dmrefresh—Refresh subscription," [accessed Jan. 28, 2021], 2 pages, <https://www.ibm.com/support/knowledgecenter/SSTRGZ_11.3.3/com.ibm.cdcdoc.cdcforsybase.doc/refs/dmrefresh.html>.

IBM, "mincommit—Number of commits to group configuration parameter," [accessed Feb. 2, 2021], 3 pages, <https://www.ibm.com/support/knowledgecenter/en/SSEPGG_11.5.0/com>.

Kent State University, "Advanced Topics of Oracle Backup and Recovery," [accessed Oct. 9, 2020], pp. 1-27, <http://www.cs.kent.edu/~wfan/link/dbapre/dbatest/54915f.htm>.

Leszczynski, "Oracle GoldenGate point in time source database recovery," Jun. 12, 2018, pp. 1-14, <https://www.bersler.com/blog/oracle-goldengate-point-in-time-source-database-recovery/>.

Mell, et al., "The NIST Definition of Cloud Computing," Recommendations of the National Institute of Standards and Technology, U.S. Department of Commerce, Special Publication 800-145, Sep. 2011, 7 pages.

Microsoft, "Restore data using a recovery database," Jul. 8, 2020, 4 pages, <https://docs.microsoft.com/en-us/exchange/high-availability/disaster-recovery/restore-data-using-recovery-dbs?view=exchserver-2019>.

Mohan, et al., "Aries: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.

Oracle, "Backup and Recovery User's Guide, 22 Recovering Tables and Table Partitions," [retrieved Oct. 9, 2020], pp. 1-8, <https://docs.oracle.com/en/database/oracle/oracle-database/18/bradv/rman-recovering-tables-partitions.html#GUID-87B7F772-335F-4179-81C9-91678D026D01>.

Pending U.S. Appl. No. 17/016,314, filed Sep. 9, 2020, entitled, "Dynamic Selection of Synchronization Update Path", 36 pages.

Progress Openedge, "Restoring a source database," Oct. 9, 2020, 1 page, <https://documentation.progress.com/output/ua/OpenEdge_latest/index.html#page/ffr/restoring-a-source-database.html>.

Saleem, "Cost Optimization for Data Placement Strategies in an Analytical Cloud Service," University of Stuttgart, Oct. 17, 2016, 106 pages, <https://elib.uni-stuttgart.de/bitstream/11682/9824/1/main-report.pdf>.

Stolze et al., "Partial Reload of Incrementally Updated Tables in Analytic Database Accelerators," 2019, 11 pages, <https://btw.informatik.uni-rostock.de/download/tagungsband/C7-2.pdf>.

Stolze, et al., "Autonomous Data Ingestion Tuning in Data Warehouse Accelerators," Mar. 2017, 11 pages, <https://www.researchgate.net/publication/315697761_Autonomous_Data_Ingestion_Tuning_in_Data_Warehouse_Accelerators>.

Stolze, et al., "Extending Database Accelerators for Data Transformations and Predictive Analytics," Proc. 19th International Conference on Extending Database Technology (EDBT), Mar. 15-18, 2016, pp. 706-707, <https://openproceedings.org/2016/conf/edbt/paper-339.pdf>.

International Search Report and Written Opinion of the International Searching Authority, International application No. PCT/CN2022/076435, dated May 17, 2022, 9 pages.

International Search Report and Written Opinion of the International Searching Authority, International application No. PCT/CN2022/076471, dated May 16, 2022, 9 pages.

\* cited by examiner

ASYNCHRONOUS PERSISTENCY OF REPLICATED DATA CHANGES IN A DATABASE ACCELERATOR

BACKGROUND

Field of the Invention

The invention relates generally to crash recovery for a database, and more specifically, to a computer-implemented method for a crash recovery for linked databases. The invention relates further to a linked database system with crash recovery for linked databases, and a computer program product.

Related Art

Managing large amounts of data remains a continuous problem for enterprise IT (information technology) organizations. This is (i) due to the ever-growing amount of data and (ii) also view to the variety of the data. In addition to traditional structured data, also semi-structured and so-called unstructured data are stored in large amounts in enterprise IT systems. Furthermore, in addition to traditional transaction oriented databases, special database systems optimized for analytical processing, have been introduced to satisfy the industry requirement for more and more data analytics. On the other hand, attempts have been made to do all analytical processing in a traditional transactional database. However, it turned out that the analytic processing has a too strong and unpredictable influence on the performance of online transaction processing.

As a consequence, clever combinations of transaction oriented database management systems with analytics optimized database management systems have been introduced. One example of such combined products is based on the IBM DB2 Analytics Accelerator (IDAA) architecture.

On one side, a full-blown row-based database management system (DBMS) may serve as an application endpoint for data manipulation language (DML) operations and query executions. Using heuristic decision criteria and rules, the query optimizer may transparently decide whether a query should be executed on the source DBMS—especially online transaction processing—or offloaded to a target DBMS—especially, for online analytical processing.

The target DBMS may be a full-blown column-based database management system holding a shadow copy of a selected set of the source DBMS tables. Strategies for creating shadow copies of the target DBMS may comprise transferring data stored in one or more tables of the source DBMS to the target DBMS at a given point in time. However, query data in the target DBMS might be out of date if the loading was performed some time ago and the corresponding source table has been modified in the meantime. Therefore, the contents of the tables are usually adapted incrementally as changes are recorded in the corresponding source database tables.

Both database systems implement transaction mechanisms to guarantee ACID (atomic, consistent, isolation, durable) properties of the respective database. I.e., concurrent modifications are properly isolated via locking techniques, and consistency checks may guarantee that the database state is transferred from one consistent state to another one and, logging techniques such as write-ahead-logging may be implemented in order to guarantee atomicity and durability for transactional changes.

However, guaranteeing ACID properties may cause significant overhead when the source database is modified by current transactions. In particular, logging slows down processing insert/update/delete (IUD) statements because change records have to be written to a persistent storage medium before transactions can continue. Compared to the frequently used in-memory processing of changes to the content of the database table, adding this persistence layer using transaction logs is comparatively slow. On the other hand, a crash recovery is required to restore the latest consistent state of the respective database in the event of a failure.

In the database accelerator context, like IDAA, the target accelerator database simply mirrors a snapshot of the source database. I.e., the source database may act as the master of the data, or data manipulations via IUDs may be processed by the source database management system and, changes are replicated to the target database via an update technique. The accelerator database, therefore, may act as a cache for storing partitions of the source database that may need fast analysis operations.

Several disclosures already exist in this context. The document US 2015/0 205 853 A1 describes a method for replicating database data and generating read-only copies of the replicated data in a clean shutdown state. A related system can include a tracking module that monitors first transactions from a database application to a source storage device to generate log entries having at least one marker indicating a known good state of the application. The system further includes a computer coupled to a target storage device comprising a database and log files. The computer processes the transactions based on the log entries, to replicate data to the target storage device, performs a first snapshot and replays data stored in the log files into the database.

In addition, document US 2014/0 279 930 A1 describes a distributed database system which implements fast crash recovery. Upon recovery from a database head node failure, a connection with one or more storage nodes of a distributed storage system storing data for a database implemented by the database head node may be established. Upon establishment of the connection with a storage node, that database may be made available for access, such as for various access requests.

However, all of the traditional coupled databases being optimized for transactions on one side, and for analytical processing on the other side, may require the known overhead for maintaining persistent recovery logs which may slow down the processing of the combined databases significantly in addition to a non-optimized usage of the changes from the source database in the target database. Therefore, there may be a need to reduce the required overhead in order to achieve higher performance values for a combined transactional/analytical database management system and solve the recovery problem of the target database elegantly at the same time.

SUMMARY

According to one aspect of the present invention, a computer-implemented method for a crash recovery for linked databases may be provided. The linked databases may comprise a source database and a related target database, and selected queries against a database management system comprising the source database may be transferred to a database management system comprising the target database for processing. The method may comprise synchronizing selected portions of content of tables of the source database with respective portions of content of tables of the target database, applying, during the synchronizing, changes to the source database to an in-memory target database portion of the database management system comprising the target database using a recovery log file of the source database, and storing persistently applied changes to the in-memory target database portion asynchronously to a persistent target database storage.

Upon a database crash of the target database system, the method may comprise restoring the in-memory target database portion with the latest snapshot available in the persistent target database storage, and applying, upon the database crash on the target database system, changes from the source database recovery log file that have a later timestamp than the latest snapshot available in the persistent target database storage to the in-memory target database portion.

According to another aspect of the present invention, a linked database system with crash recovery for linked databases may be provided. The linked databases may comprise a source database and a related target database, and selected portions of content of tables of the source database may be synchronized with respective portions of the content of the tables of the target database. The linked database system may comprise a processor and a memory, communicatively coupled to the processor, wherein the memory may store program code portions that, if executed, enable the processor, to synchronize selected portions of content of tables of the source database with respective portions of content of tables of the target database, apply, during the synchronizing, changes to the source database to an in-memory target database portion of the database management system comprising the target database using a recovery log file of the source database, and store persistently applied changes to the in-memory target database portion asynchronously to a persistent target database storage.

The memory may also store program code portions that, if executed, enable the processor, to restore, upon a database crash on the target database system, the in-memory target database portion with the latest snapshot available in the persistent target database storage, and apply, upon the database crash on the target database system, changes from the source database recovery log file that have a later timestamp than the latest snapshot available in the persistent target database storage to the in-memory target database portion.

The proposed computer-implemented method for a crash recovery for linked databases may offer multiple advantages, technical effects, contributions and/or improvements:

The update and change as well as the queries against the in-memory portion may continue without any slowdown by also storing the changes to the target database persistently. Hence, the logging and state storage of physical database data structures may be decoupled from processing IUDs inside database transactions. This means that the persistency phase is skipped when changes are performed on the target database—in particular in the in-memory portion—and update operations may continue without an additional delay. Therefore, records that would be required for crash recovery of the target database may be written asynchronously by a dedicated asynchronous data persistency service. Changes made by IUD transactions are just applied to the in-memory representation of the data, where they may be immediately processed by database queries that are offloaded to the target database, i.e., the accelerator, regardless of whether they are already stored on persistent media on not. This may also be interpreted as lifting the durability constraint of ACID properties of the database.

Due to asynchronous writing of committed changes from in-memory data structures to their persistent counterparts, some of them might be missing in the target database system in case of a database crash. The crash recovery, therefore, may have to synchronize the potentially incomplete snapshot with the source database system by replaying missing changes. Unlike in other solutions in which offloaded tables are not fully reloaded with a bulk loading mechanism, the missing portions may be recovered incrementally. That is, the target database state may be recovered from the latest asynchronously persistent snapshot of the target database, and, with the help of recovery metadata, determines, which additional changes may still be missing. I.e., which changes from the source database needs to be replayed by the target databases from the source database system's transaction or recovery log file to finally restore the current consistent state of the target database.

This makes it possible to delay incoming queries in the target database while the recovery processes are active until a consistent and updated state has been reestablished in the in-memory portion of the target database. The delay caused by the recovery may be much lower if compared to known solutions, but processing and storage cost for asynchronously maintaining the database snapshot on the target database system may be a little bit higher. However, this is only a low price for a higher availability and short-term recovery times of the target database system.

The asynchronous persistent storage of changes to the target database may also help to execute the logging more efficiently, VO operations may be executed more efficiently—e.g., by a batch process—or self-compensating changes may be deleted altogether That is, a target record that has been changed in a way which may be reverted before a next persistent storage step of changes of the target database can be deleted in a buffer between the target database and the persistent storage medium.

In the following, additional embodiments of the inventive concept—applicable to the method as well as to the system—will be described.

According to one interesting embodiment of the method the synchronizing may comprise reading entries of a recovery log file relating to the source database and applying the read entries to the target database. This may be performed by the management portion of the target database management system. However, also other techniques for synchronization may be used, e.g. based on SQL (structured query language) or Q, i.e., a query language optimized for column-based databases.

According to one useful embodiment of the method, the source database may be optimized for transactions—i.e., online transaction processing (OLTP)—and/or wherein the source database is a row-oriented relational DBMS. This may represent and support efficiently the operational backbone of enterprise IT (Information Technology) operations. A row-oriented database may be optimized for a balanced fast read, write and change operations to the data in the database. It may also be good for generating reports. However, this type of database is often not optimal for analysis-type of operations.

According to one permissive embodiment of the method, the target database may be optimized to analytical operations—i.e., online analytical processing (OLAP)—and/or the target database may be a column-oriented database. This type of database—according to a further embodiment—may be a column-oriented database. It may support queries with many dependencies and cross-correlations much better then OLTP optimized database systems.

According to an advantageous embodiment, the method may also comprise delaying, in case of a crash of the target database, queries against the target database until a recovery of the target database may be finished. Thus, the recovery process may be transparent for a user. He may eventually experience a little delay in his analysis query. However, because the response-time for complex analysis queries is comparably long anyway, the user may not be aware of the delay at all.

Optionally, queries targeted to the target database may be executed by the source database during the recovery process of the target database. This may slow down the source database a little bit during the transactions, however, for the overall user satisfaction this may be an acceptable compromise.

According to a preferred embodiment of the method, metadata defining the selected tables may be part of the recovery log file. This way, the general architecture of the in-memory target database may already be defined in the recovery log file of the source database. This may also be true for the portions of data of tables to be mirrored to the source database. Hence, a single source for data definitions may be used so that no conflicting situations may be provoked.

According to an advanced embodiment of the method, the storing of persistently applied changes may comprise waiting until a predefined number of changes in the in-memory target database portion may have been completed. The predefined number may be configurable during the setup of the database and/or may also be altered during the operation of the database management system. However, the advantage of this approach may be that it does not slow down of the analytical operations of the target database. Hence, a group of updates to the target database may be extracted and persistently stored in one go. Besides using a predefined number of changes on the target database, one may also consider to monitor the load to the target database and performing the persistent storage of changes to the target database during time periods in which the analysis load to the target database is comparatively low.

This feature may be implemented inside a separate thread or process which may wait until a predefined number of changes are completed in the in-memory portion. For each change inside the set of completed changes since the last run, the changes are persisted to the persistent database portion of the target database. Additionally, also related metadata are persistently stored describing the recently persisted change (such as the last corresponding block record sequence number inside the source database system) for being able to identify change replay points during the recovery phase. From this, a point in time of the last consistent changed set that has been stored may be possible. This point in time may be helpful to recover the in-memory portion of the target database from the persistent portion of the target database and, incrementally recover the remaining IUDs of the in memory-portion of the target database from the recovery log file of the source database. These additional data are—in case of a required recovery of the target database—requested from the source database or the incremental update process. At the end of the recovery process, the query processor may be informed by an "active again" signal that queries may be processed from the target database from then on.

According to another advantageous embodiment of the method, the restoring of tables—or the partitions thereof—of the in-memory target database portion may comprise a prioritizing or prioritization of the recovering or recovery according to one selected out of the group consisting of a data usage, a query priority and data priority.

These options are detailed in the paragraphs below. However, the general concept is to allow different optimization methods during the recovery process in order to allow an execution of queries although the target database "is under reconstruction", i.e., being in recovery mode. These optimization options may be configurable and may—in general—be combinable in one implementation.

According to one optional embodiment of the method, the prioritizing of the recovery according to the data usage may comprise maintaining a counter for each table—or a partition thereof—in the target database. The counter value of the counter may be indicative of how many queries may be waiting for the related table, and restoring firstly the database table with the highest counter value first. Later on, the other tables may be recovered subsequently. This option may allow a quick recovery of those tables of the target database being in high demand Hence, the users may be provisioned as soon as possible with a completely recovered portion of the database, i.e., the tables being in high demand. This option may be denoted as demand or data usage optimized recovery.

Hence, the list of waiting queries may be considered for controlling the recovery process and to minimize the recovery time. Once a new database query arrives at the target database while recovery is in progress, its data accesses may be analyzed. If it does not access non-recovered data, it may be processed immediately. Otherwise, the query is registered in a list of waiting queries as part of the recovery state. The recovery stages are evaluated by a recovery schedule in order to derive a sequence of recovery actions, preferring those tables and/or table partitions that actually block queries. The most valuable recovery action may be scheduled via one of the available recovery strategies upon completion of the recovery, the recovery state may be updated and waiting queries for the recovered table and/or partition may be notified if they do not need to be blocked anymore.

In a more detailed view, the crash recovery on the target database can be described as follows: firstly, the list of tables or table partitions that need to be recovered by using known recovery metadata on the target database. Secondly, the list of to-be-recovered tables or table partitions is stored inside the recovery state. Thirdly, while the to-be-recovered list is not empty, the following may be executed:
(i) determine the next to-be-recovered tables and/or table partition from the list;
(ii) scheduled the recovery action via the recovery strategy that is configured for the target database;
(iii) wait until the recovery action completes;
(iv) update the recovery state, i.e., mark the table/partition to be recovered, and remove the table/partition from the blocking data list of ever query waiting for the table and/or table partition; and
(v) determine the list of query whose blocking data list became empty and notify the query processor so that it can process the query now.

Thereby, the list of to-be-recovered tables and/or table partitions may be implemented by a priority queue, using the below described algorithm to dynamically calculate the next recovery item for the next recovery cycle. The steps mentioned under (iii) may be executed in parallel for multiple tables and/or table partitions in order to speed up the recovery process.

The determination of the to-be-recovered tables and/or table partitions may be executed as follows:

(i) when the crash recovery process is initiated, create an empty histogram of blocking tables and/or table partitions;
(ii) when the blocking query is registered in the recovery state, increase the usage counter for each table and/or table partition in the query's blocking area list by one;
(iii) when the next to-be-recovered table/table partition needs to be determined, select the table/table partition having the largest usage counter; and
(iv) when a table/table partition recovery action finishes, remove the corresponding histogram data.

According to another optional embodiment of the method, the prioritizing the recovery according to the query priority may comprise restoring firstly those database tables receiving queries with the highest priority. Such a priority value may be assigned to a database system—e.g., production database versus test database—or may also be assigned based on an individual query. This option may be denoted as query priority or simply data priority optimized recovery.

According to a further optional embodiment of the method, the prioritizing the recovery according to the data priority may comprise maintaining (at least) two groups of database tables, each group relating to a separate group of users, and restoring firstly the database tables of the group having a higher configured group priority. Such a situation may happen in a multi-user/multi-group/multi-tenant environment in which one user, or group, or tenant may have assigned a higher priority for queries. E.g., one tenant may have a higher guaranteed availability of the database system. In such a case, this tenant may be assigned a higher priority. Such a scenario may work best in a multi-tenant database being operated in a cloud computing data center. This option may be denoted as customer priority optimized recovery.

According to another interesting embodiment, the method may also comprise determining the data volume to be recovered for next to-be-recovered tables, and recovering the table(s) using a recovery strategy depending on the volume to be recovered. Thereby, the recovering strategy is an incremental update strategy or a bulk update strategy. Thus, it may be decided database table by database table (or group of database tables) which update strategy to be used in order to minimize the total recovery time of the target database. This option may be denoted as time-optimized recovery.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
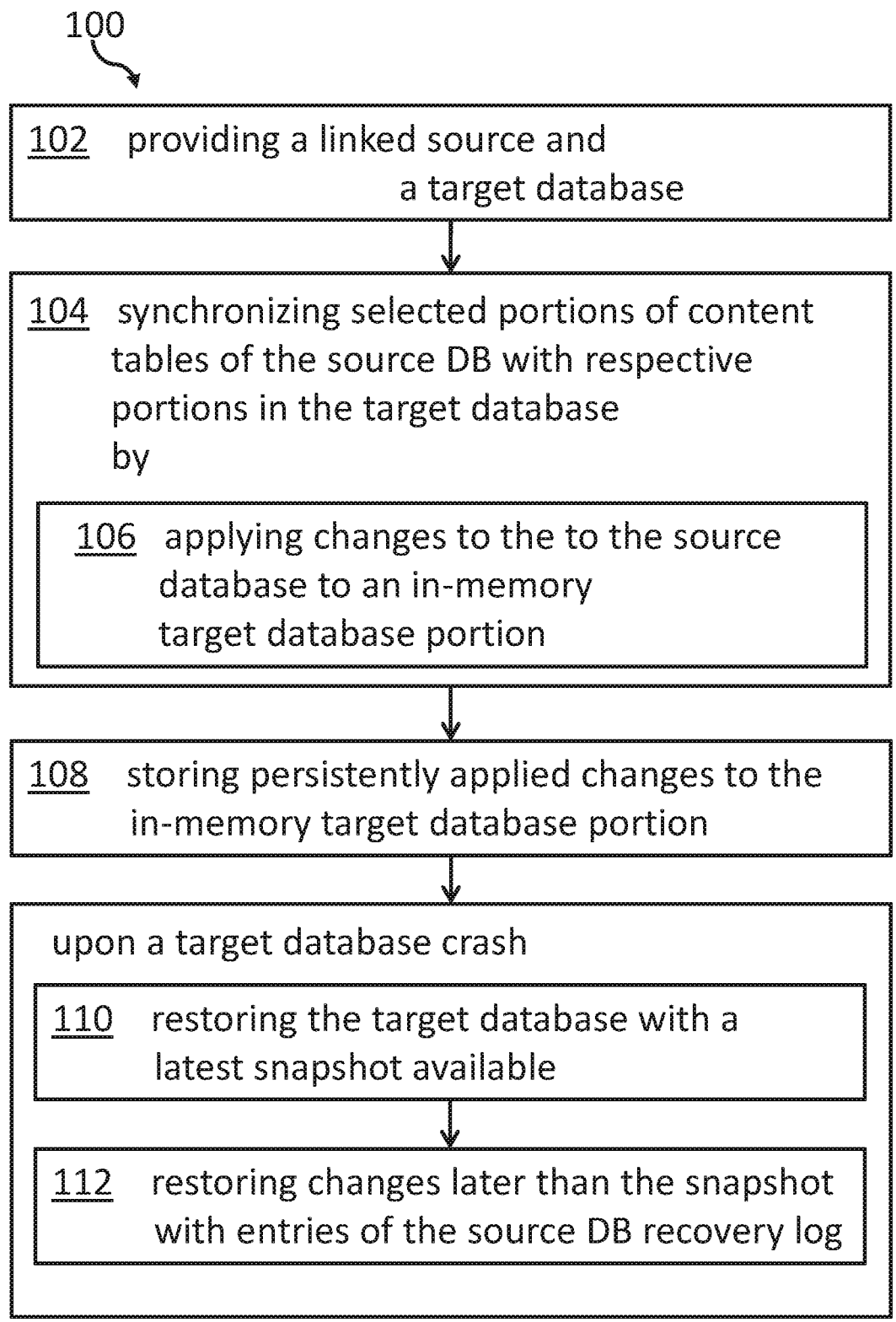

Preferred embodiments of the invention will be described, by way of example only, and with reference to the following drawings:

FIG. 1 shows a block diagram of an embodiment of the inventive computer-implemented method for a crash recovery for linked databases.

Figure 2:
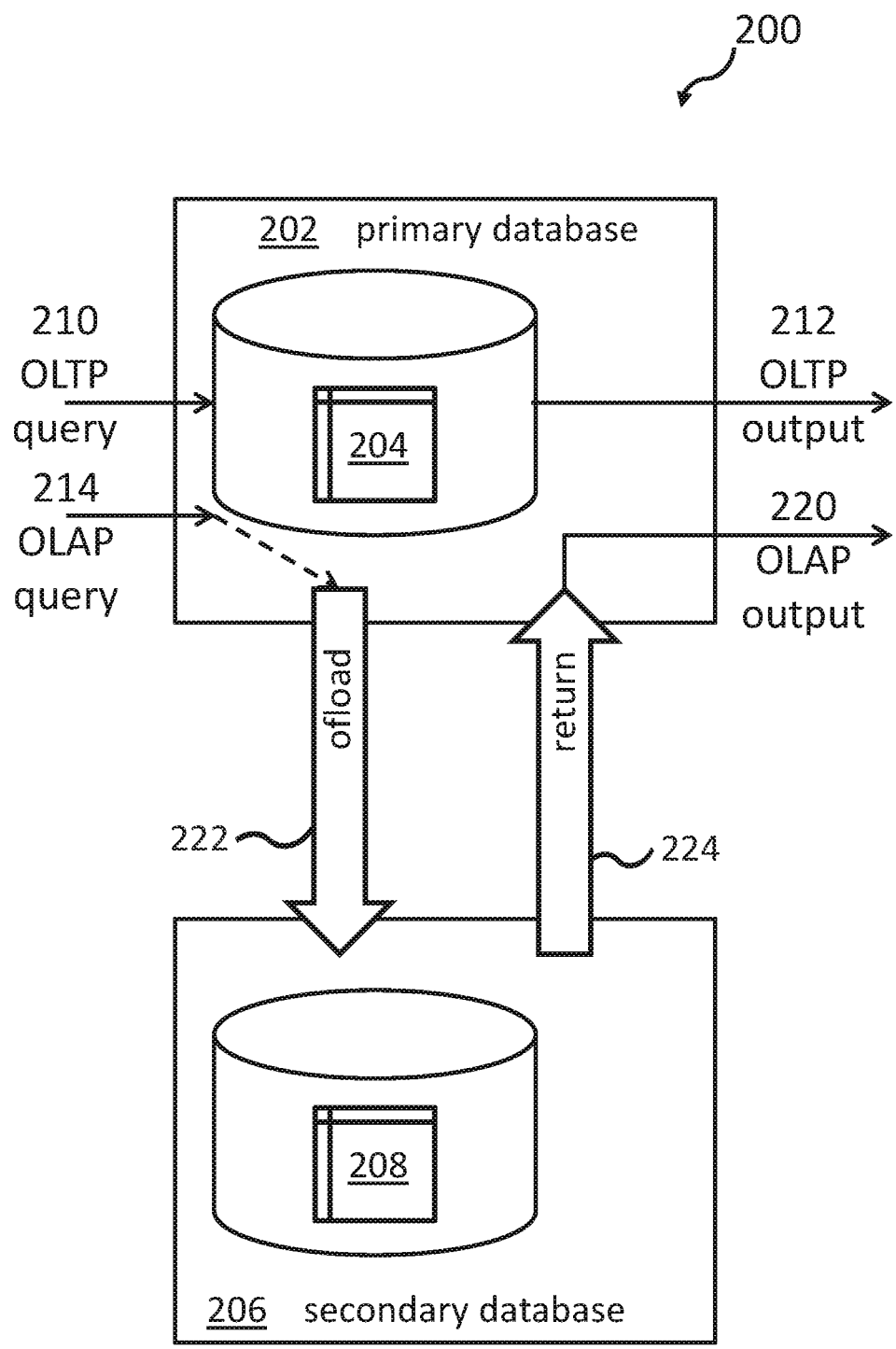

FIG. 2 shows a block diagram of an embodiment of linked databases.

Figure 3:
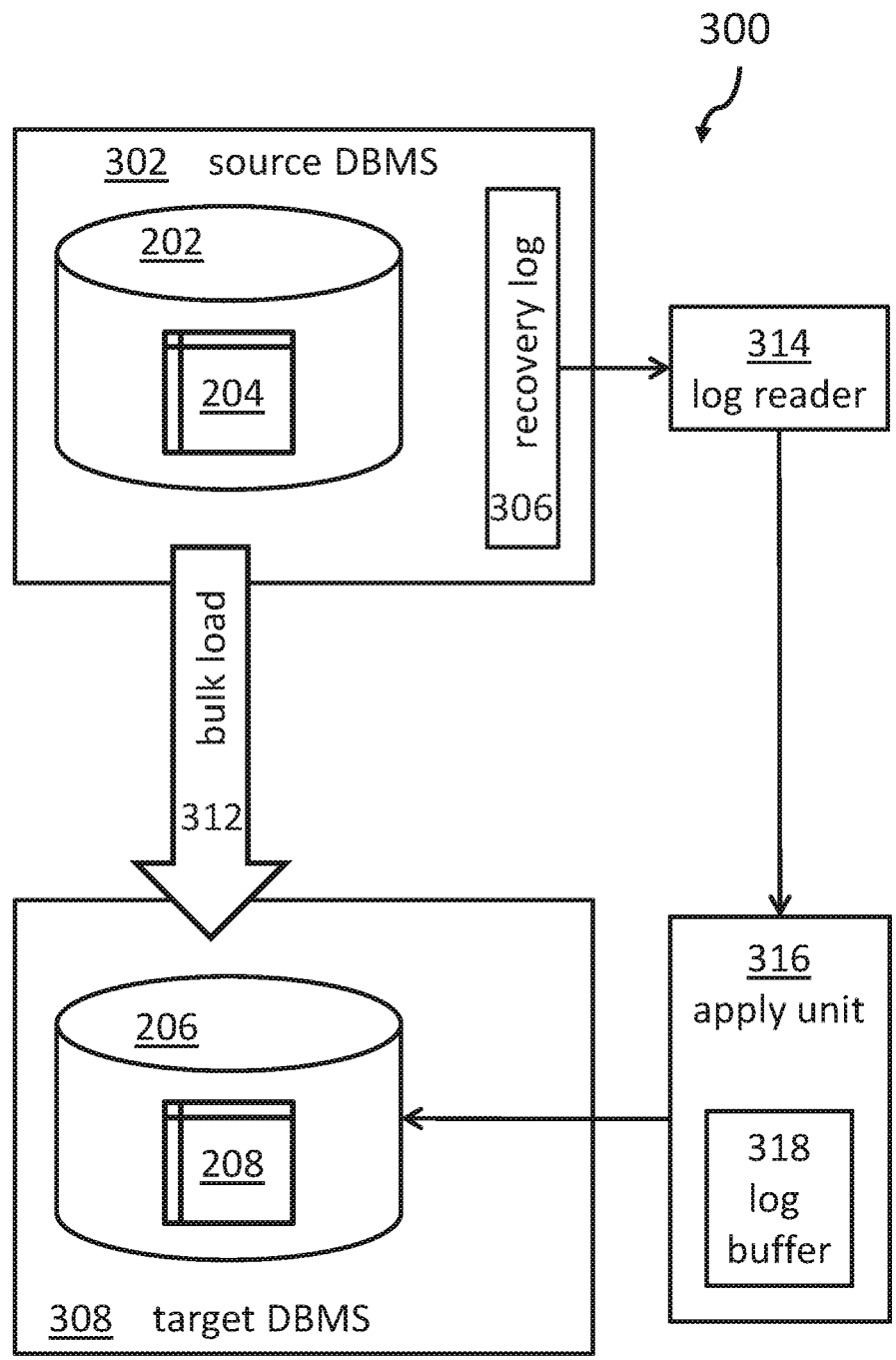

FIG. 3 shows a block diagram of an embodiment of how the target database may be synchronized.

Figure 4:
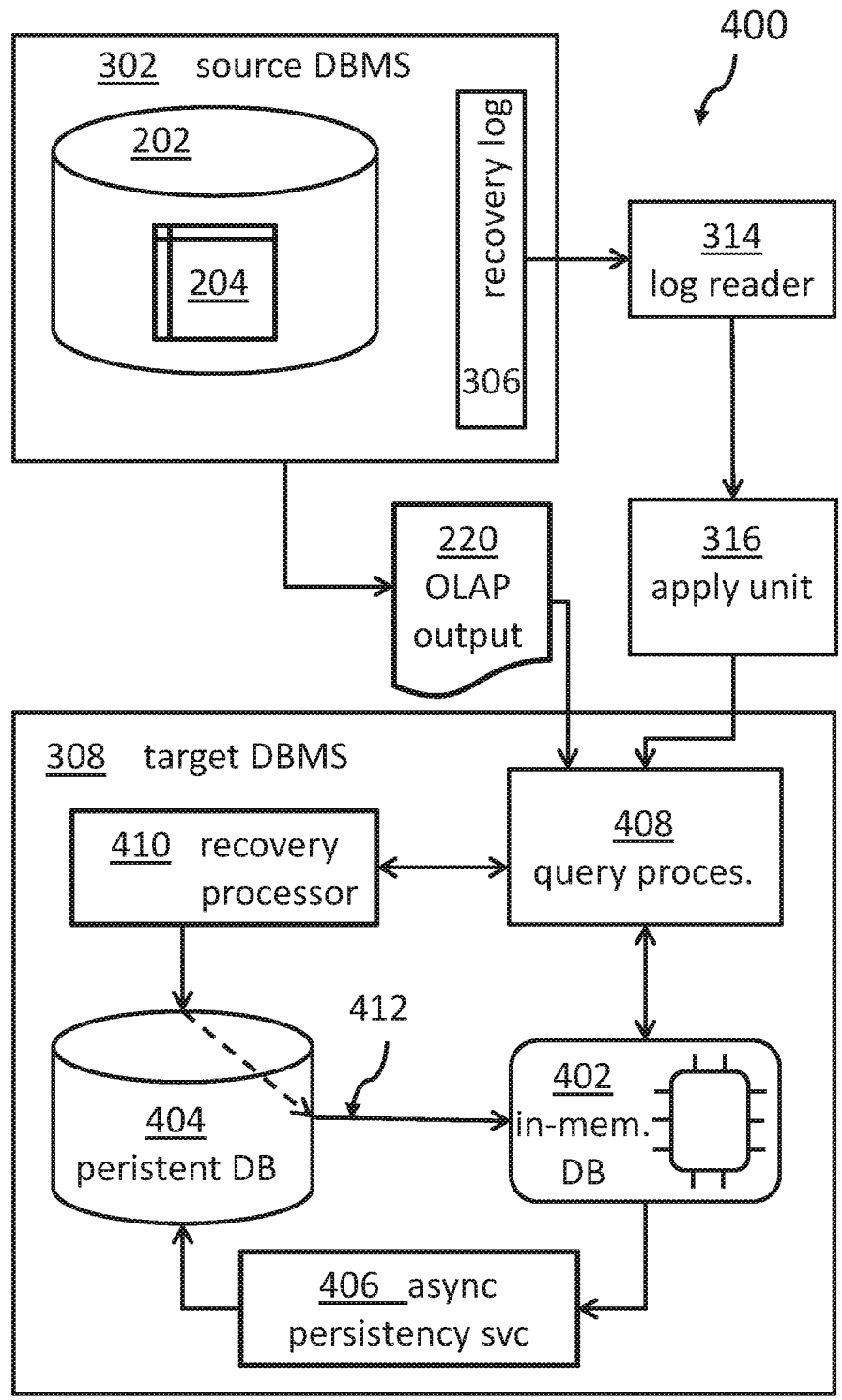

FIG. 4 shows a block diagram of an embodiment of the proposed concept in a more implementation-near form.

Figure 5:
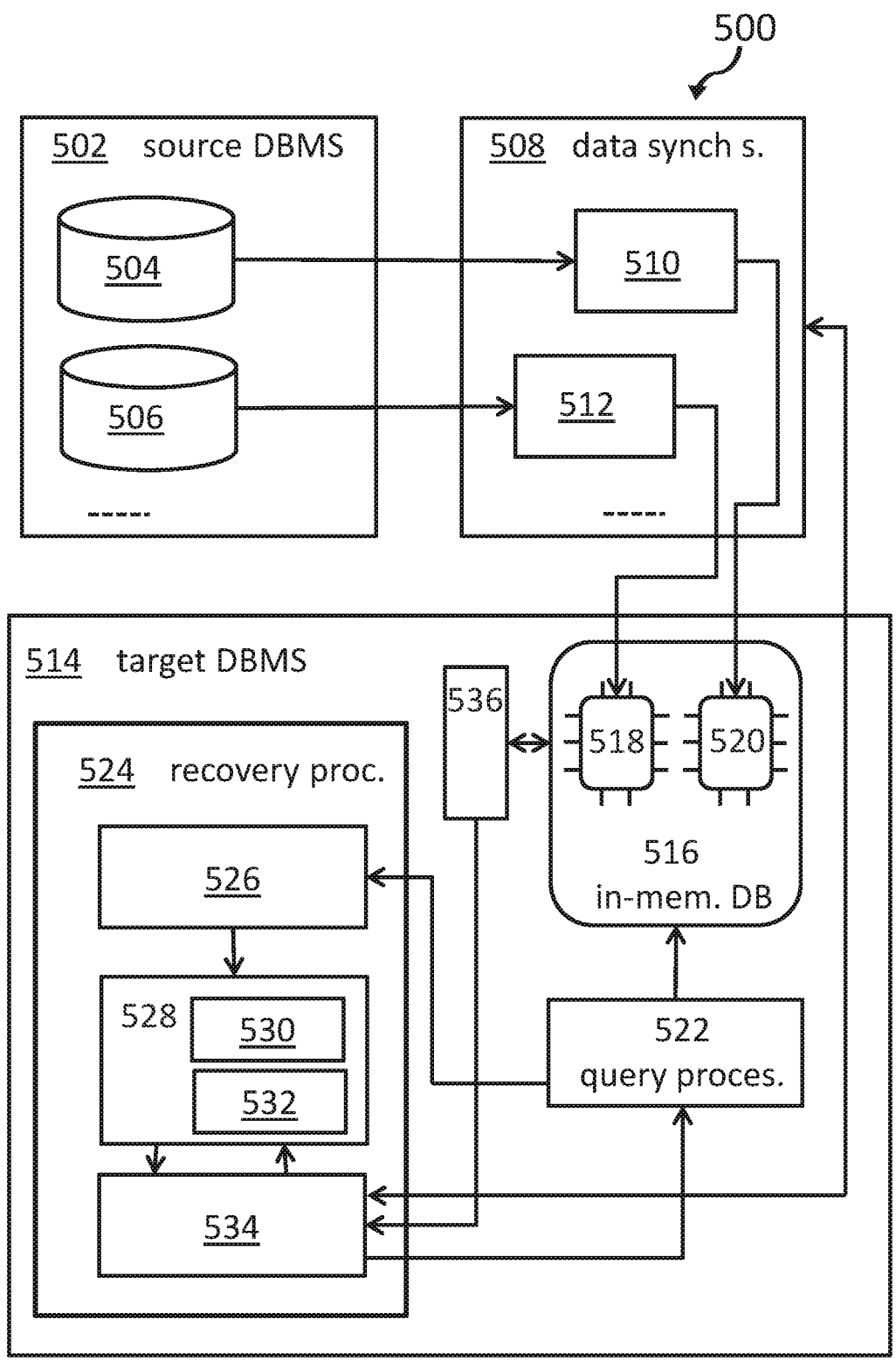

FIG. 5 shows a block diagram of an embodiment of the linked database system comprising components for a customer priority optimize recovery strategy.

Figure 6:
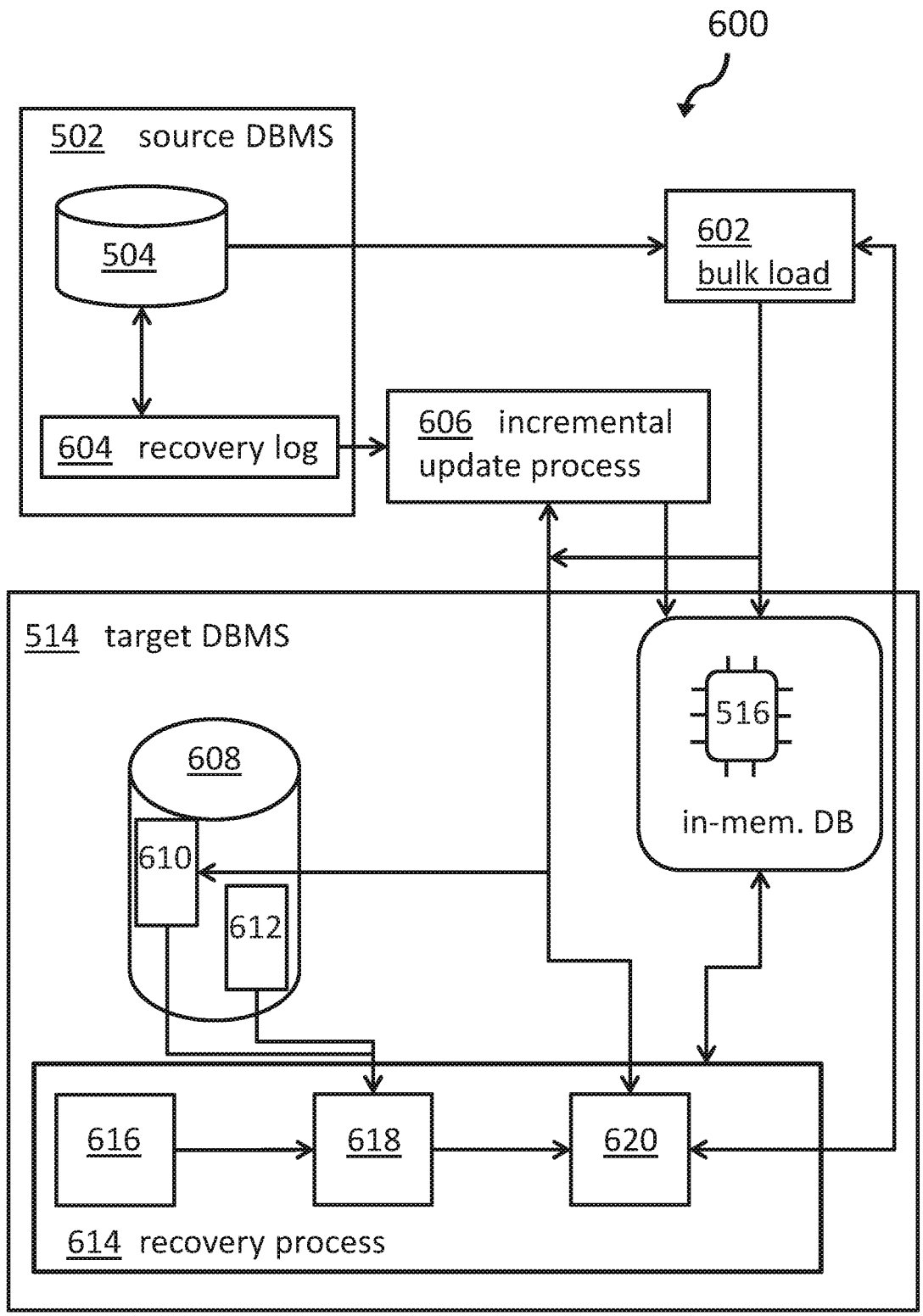

FIG. 6 shows a block diagram of an embodiment of the linked database system comprising components for a volume optimize recovery strategy.

Figure 7:
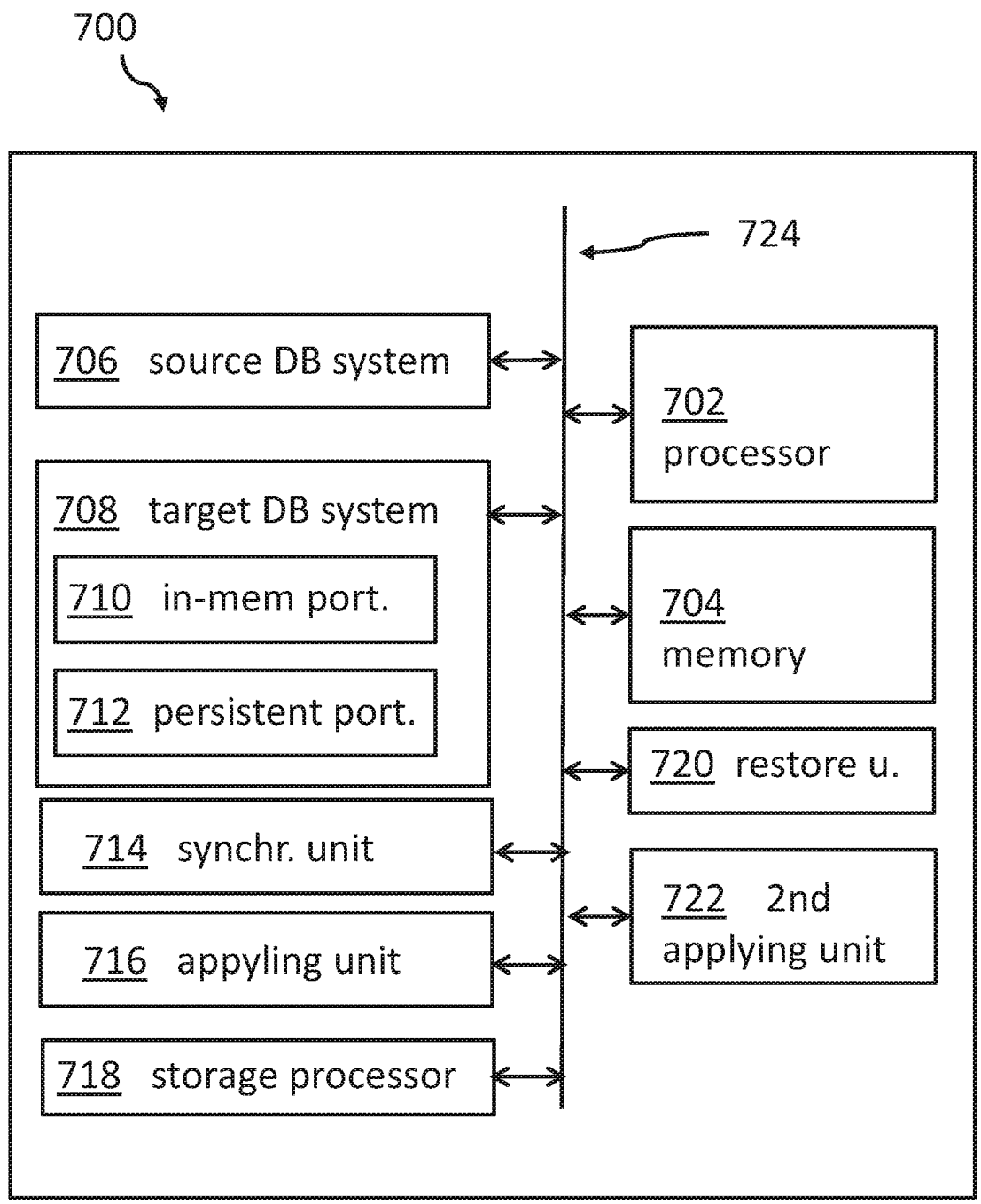

FIG. 7 shows a block diagram of an embodiment of the linked database system for a crash recovery for linked databases.

Figure 8:
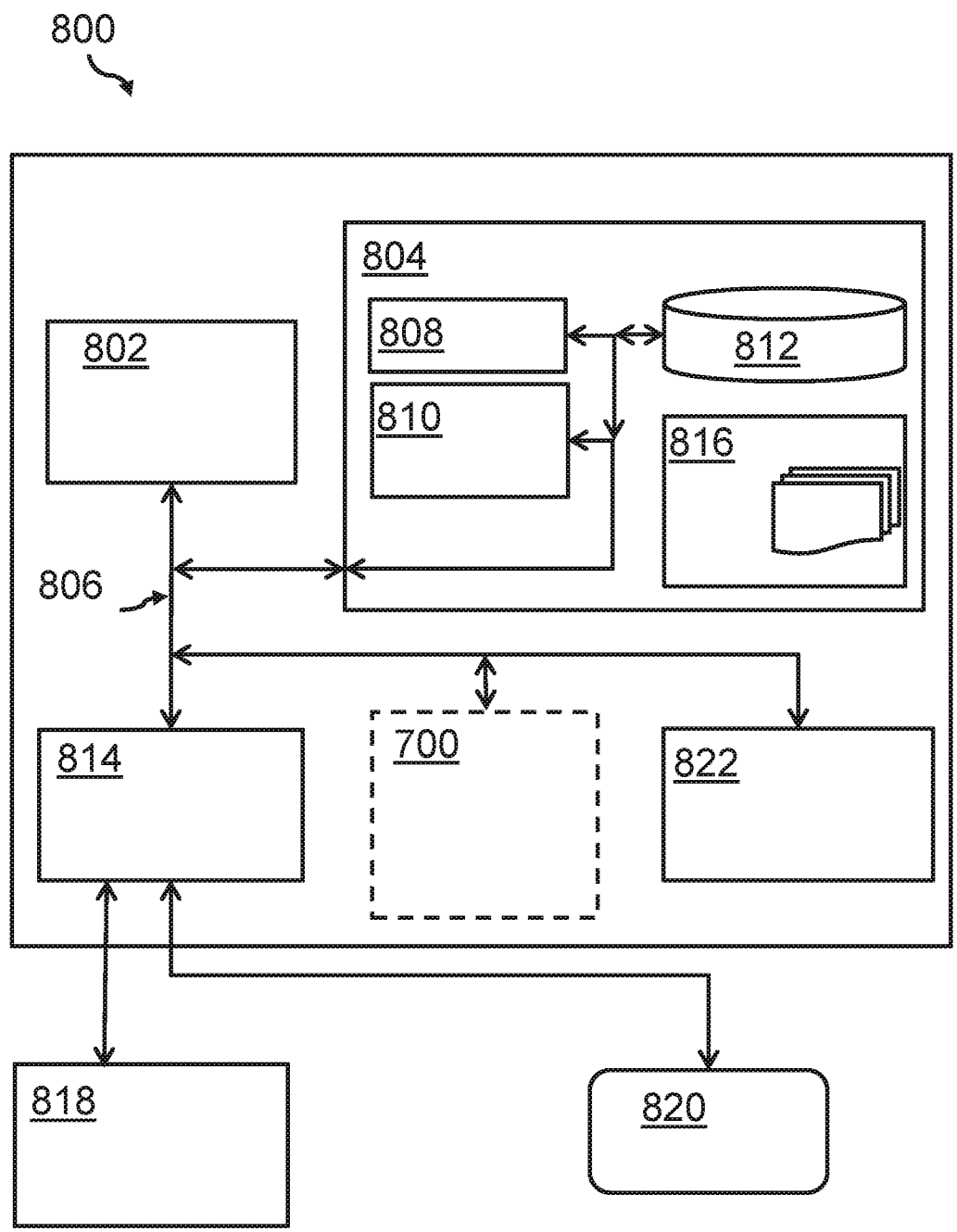

FIG. 8 shows an embodiment of a computing system comprising the linked database system.

DETAILED DESCRIPTION

In the context of this description, the following conventions, terms and/or expressions may be used:

The term 'crash recovery' may denote a process of reconstructing a state of a database before the crash has happened. If a crash happens, data may not be available or inconsistent.

The term 'linked databases' may denote at least two databases that are closely related to one another. In the context of this document linked databases may be denoted as those that may store, at least in part, identical data. On the other hand, the primary database may be optimized for other tasks than the secondary database in such a couple.

The term 'source database'—or 'primary database'—may denote a database being optimized for, e.g., fast transactions, i.e., online transaction processing. However, databases optimized in such a way—i.e., for fast read, write, update operations on the data—may be slow in performing complex queries involving a high number of tables or a large number of data like in the case of online analytical processing. Additionally, the online analytical processing may slow down the online transaction processing. Therefore, highly optimized database management systems of the just mentioned types of databases may successfully work as a tandem.

The term 'target database'—or 'secondary database' may denote the second database in such a tandem of databases being optimized for different tasks. In the context of the here described concept, the target database may be optimized for online analytical processing. It may store at least portions of the tables and portions of the data in the tables of the source database. The target database may also be comprised of two portions: an in-memory portion for a fast execution of complex and multi-dimensional queries, and a persistent portion which may store the tables and data of the in-memory portion of the target database on the longer-term storage, e.g., a hard disk or a flash memory. This way, the target database may be enabled to—in case of a crash of the target database—recover most of its content from the persistent storage.

The term 'selected portions of content of tables' may denote the just mentioned portions or partitions of the data of portions of the tables of the primary database which may be copied and kept in sync in the target database.

The term 'selected queries' may denote a specific type of queries addressed to the linked databases which may better be executed by one of the two databases—in particular, the target database—based on the nature of the query. E.g., if the query type relates to online analytical processing, the query may be forwarded to the target database and may not be executed by the source database.

The term 'database management system' may denote a combination of an administration/management system, typically being implemented in a combination of hardware and software and at least one related database storing the data.

The term 'in-memory target database portion' may denote the part of the target database which may hold almost all of its data in the main memory of the computer system. The database management system of the target database may comprise an in-memory portion and a persistent portion of the target database, wherein the persistent portion may be—apart from the last changes to the in-memory—a persistently stored copy of the in-memory portion.

The term 'persistent target database storage' may describe that part of the target database management system enabled to store the data of the target database persistently, i.e., using a hard disk or flash memory instead of in-memory storage.

The term 'latest snapshot' may denote a last consistent stored status of the target database.

The term 'later timestamp'—in particular a change having a later timestamp—may denote e.g., a record of the recovery log file of the source database comprising a time indicator that may time-wise be created later than the latest snapshot stored by the persistent portion of the target database.

The term 'recovery log file' may denote a sequential file protocolling operations being performed on a database, particularly, all those operations that modify the data, i.e., insert, update and delete operations. The recovery log file may be designed to allow a complete reconstruction of the database. Therefore, also the table definitions of the database may be part of the recovery log file.

The term 'metadata' may denote data about data, in particular a definition of data of tables in a database and potentially relations between them.

In the following, a detailed description of the figures will be given. All instructions in the figures are schematic. Firstly, a block diagram of an embodiment of the inventive computer-implemented method for a crash recovery for linked databases is given. Afterwards, further embodiments, as well as embodiments of the linked database system with crash recovery for linked databases, will be described.

FIG. 1 shows a block diagram of a preferred embodiment of the computer-implemented method 100 for a crash recovery for linked databases—in particular, according to an IDAA architecture—wherein the provided, 102, linked databases comprise a source or primary database—in particular, optimized for transactions, e.g., a role-based database—and a related target or secondary database. This may be optimized for online analytical processing operations (OLAP) and may advantageously be organized column-based.

Selected queries—in particular, those directed to analytics operations—against a database management system comprising the source database are transferred, i.e., offloaded, to a database management system comprising the target database for processing.

The method 100 also comprises synchronizing, 104, selected portions of content of tables of the source database—in some databases only portions of data of portions of the tables and in other implementations a complete copy—with respective portions of content of tables of the target database, by applying, 106, during the synchronizing, changes to the source database to an in-memory target database portion of the database management system comprising the target database using a recovery log file of the source database.

Additionally, the method 100 comprises storing, 108, persistently applied changes to the in-memory target database portion asynchronously to a persistent target database storage portion, and, upon a database crash on the target database system, restoring, 110, the in-memory target database portion with the latest snapshot available in the persistent target database storage, and applying, 112, upon the database crash of the target database system, changes from the source database recovery log file that have a later timestamp than the latest snapshot available in the persistent target database storage to the in-memory target database portion.

Optionally, also the persistent portion of the target database may be updated in parallel. However, for this, also the persistent storage process or storage processor would need to be active to persistently store changes of the in-memory portion of the target database.

Additionally, it may be advantageous to bulk-load the target database from the source database, in particular during an initialization process. This can help to avoid the comparable slower incremental update or synchronization process because the source database may already have a larger number of entries and thus a larger number of entries in its recovery log file. The initialization may also work for selected tables or partitions thereof only.

FIG. 2 shows a block diagram of an embodiment 200 of linked databases. The primary or source database 202 receives OLTP queries 210 and OLAP queries 214. Those queries that are identified as OLAP queries 214 are transferred or offloaded, 222, to the secondary or target database 206. The source database 202 comprises a plurality of tables 204 and related stored data. The target database 206 also comprises tables which represent at least a subset of the database tables 204 of the source database 202 and at least a subset of the data in the database tables 208.

After the OLAP operation has been performed by the target database 206, the data are returned, 224, and the OLAP output 220 is returned back to the requesting program or process. OLTP queries 210 are executed directly in the source database 202 and returned as OLTP output 212 to the requesting program or process. Hence, the OLTP or source database 202 may operate at its best performance because it is not slowed down by any resource intensive OLAP queries.

Because of a potentially different data organization in the target database 206—e.g., column-oriented instead of row-oriented as in the source or OLTP database 202—the target database may return, 224, OLAP results much faster than the source database 202.

FIG. 3 shows a block diagram of an embodiment 300 of how the target database can be synchronized. The source database management system 302 controls the operation of the source database 202 and its related tables 204 (compare FIG. 2). The same applies to the target database management system 308 for the target database 206 and the related tables 208.

The source database management system 302 also maintains the recovery log file 306 for the source database 202. A log reader or log file reader 314 reading the recovery log file 306 provides these data to the applying unit 316 which applies the changes (i.e., insert, update, delete) performed to the source database also to the target database 206 for the selected tables and the selected set of data. The selected tables and the selected set of data may be a subset of those related tables and data in the source database 202 as defined beforehand. The applying unit 316 can optimize the application of the changes to the target database 206 depending on executed OLAP queries. For this, the log buffer 318 can be instrumental.

For an initialization of the target database 206, a bulk load operation 312 can be performed for performance reasons from the source database 202 to the target database 206.

It may be noted that FIG. 3 does—for reasons of clarity of the inventive concept—not yet show the split of the target database management system into an in-memory portion and a persistent portion of the target database 206 and its tables 208. This will be shown in the next figure.

It may be noted that this synchronization mechanism may represent one of many synchronization techniques. Also other synchronization techniques may be applicable.

FIG. 4 shows a block diagram of an embodiment of the proposed concept in a more implementation-near form 400. The elements of the source database management system in those used optionally to synchronize the source database with the target database (mainly the upper part of FIG. 4) will not be described again.

The target database management system 308 comprises the in-memory portion 402 of the target database and the persistent portion 404 of the target database. The persistency service 406 writes the status of the in-memory target database portion 402 to the persistent database 404 during the operation. During such regular operations—e.g., after a predefined number of updates have been made to the in-memory database 402—the query processor 408 directs the incoming queries to the in-memory portion 402 of the target database.

However, if the target DBMS is currently performing crash recovery—especially in case of the demand or data usage optimized recovery—things work differently:
(i) the query processor 408 together with the recovery processor 410 analyzes the queries data accesses to determine a list of target tables and/or lists of table partitions that need to be available for the query using state-of-the-art query parsing a view resolution techniques;
(ii) a blocking data list is determined by looking at all tables and/or table partitions of the data access list from the previous step within the recovery state is determined that has not been yet recovered;
(iii) if the list from the previous step is not empty, the query and it's blocking data list are added to the waiting query and the query process waits until recovery finishes (blocking data list becomes empty), then the querying can continue; and
(iv) the query of the target database processed as usual after a completion notification is sent from the recovery processor 410 to the query processor 408.

During the recovery processor 410 controlled action, the latest consistent snapshot available in the persistent database 404 of the relevant tables and/or table partitions is loaded, 412, to the in-memory portion 402 of the target database, and the entries in the recovery log file 306 of the source database 202 having a timestamp later than the snapshot of the persistent database 404 are replayed to the in memory database 402. These are requested from the recovery processor 410 via the query processor 408 form the source DBMS 302, e.g., from the recovery log file 306 via the log reader 314 and the apply unit 316.

FIG. 5 shows a block diagram of an embodiment 500 of the linked database system comprising components for a customer priority optimized recovery strategy. The source DBMS 542 has exemplary a first source database 504 of a first user or tenant (e.g., in a cloud computing environment) and a second source database 506 of a second user or tenant. In additional, separated source database systems for other users or tenants may be available.

Separate data synchronization subsystems 510, 512 are implemented in the data synchronization system 508 in order to synchronize the source databases 504, 506 with the respective in-memory portions 518, 520 of the in-memory target database 516. The query process 522 receives the database queries for execution in the in-memory portion of target database(s) 516. These queries are typically the OLAP queries which have been offloaded from the source database(s) 504, 506.

The recovery process or processor 524 of the target DBMS 514 also receives data from the query processor regarding queries to be registered and analyzed in the data access analyzer 526. During the recovery process of the target database the query analyzer determines the waiting queries 530 and the already recovered table partitions 532 in the recovery state management system 528 in order to determine—based on a priority of queries of a specific user—which tables shall be recovered first. This is finally determined and decided by the recovery schedule 534. In order to perform this task, the recovery schedule 534 is in constant data exchange with the recovery state management system 528 to check the actual recovery status and receives configuration data from the workload management system configuration storage. Furthermore, the recovery schedule 534 also exchanges data with the data synchronization system 508 in order to trigger the target database management system recovery database loading from the source database management system 502.

In this way it can be ensured that the user or customer with a configured higher priority will have an early access to recovered database tables which recovery time can also be optimized depending on an access use of specific tables.

In detail, this may be achieved by the following procedure: when the crash recovery process is initialized for the target database, for each tenant an empty histogram of blocked table/table partitions is created. When a new blocking query is registered in the recovery state the usage counter for each table/partition in the query's blocking data list is increased by 1. Then, when a next to-be-recovered table/partition needs to be determined, a recovery priority of the table is determined based on the counter number of blocked query usage and the current tenants WLM (workload management system) configuration (i.e., its priority or importance), the recovery item with the highest priority is selected. Finally, when the table/partition recovery action finishes, also the corresponding histogram entry is removed.

The calculation of the user or tenant-specific recovery priorities can exemplary be implemented as follows: if there is a strict priority between tenant pairings—e.g., a production system is more important than a test system (which may be specified by a simple configuration text), the list of to-be-recovered tables/partitions are grouped by users/tenant; the list of groups is ordered by decreasing users/tenant priority; and the next table/partition is selected from the first non-empty group via the query usage counter selection algorithm.

However, if there is a relative resource sharing location for each tenant in the WLM configuration (e.g., tenant-1 50%, tenant-2 30%, tenant-3 20%), a priority for each recovery item is calculated as follows: (i) the query-usage-counter q for the recovery item is determined; (ii) then, the tenant t to which the recovery item belongs to is determined; (iii) next, the resource share location r(t) for tenant t is determined; (iv) based on that the priority is determined as a*q*b*r(t), wherein a and b are static configuration parameters—in particular in the range between [0 . . . 1]—wherein b can be calculated based on a, e.g., b=1–a, to reduce the number of parameters. Finally, (v) the list of recovery items can be ordered by priority, e.g. in a priority queue.

FIG. 6 shows a block diagram of an embodiment 600 of the linked database system comprising components for a volume optimized recovery strategy. Already with FIG. 5 introduced elements are shown with the same reference numerals. On the top left side, the source DBMS 502 is shown with a source database 504 and a related recovery log file 604. Initially, the in-memory database portion 516 of the target DBMS 514 (the persistent portion not being shown) may be by bulk loaded via the bulk loader 602.

Besides the in-memory portion 516 of the target DBMS 514, focus may be here on other metadata 608 and the recovery process or recovery processor 614. The recovery process comprises at least three components: the recovery item selection unit 616, the change estimation unit 618 and the recovery schedule 620. The recovery processor 614 is in data exchange with the in-memory database 516 in order to collect status information about the tables in the in memory database portion 516 of the target DBMS 514.

In case a database crash happens on the target DBMS side, the target database 516 needs to be restored from the source database 504 either via a bulk load mechanism or incrementally, as already described above. Additionally, here, the to-be-recovered table/table partitions are dynamically selected by the recovery process 614. The here proposed concept is extended by a change estimation component 618 that is responsible to estimate or determine the amount of data that needs to be restored during crash recovery. Therefore, this change estimation component 618 evaluates data change statistics in order to extrapolate how many data changes have accumulated in the source database since a recovery baseline timestamp. Based on this information, the recovery scheduler 620 selects the most efficient data synchronization method for restoring the data of to-be-recovered table/table partition. The data change statistics are maintained during regular updating processing, either incrementally or via bulk loading, of the target database (i.e., the in-memory database portion 516). The change estimation 618 may be triggered by the recovery item selection component 616.

The recovery scheduler 620 is also in data exchange with the bulk loader 602 and details of the incremental update process 606 in order to manage the recovery process of the in memory database portion 516. E.g., if the recovery of the in-memory database portion 516 is completed, a recovery completion notification is received from the bulk loader 602. On the other side, the recovery scheduler 620 requests change replays for specific tables in the in-memory database portion 516. Similar to the signal from the bulk loaders 602, the recovery scheduler 620 also receives a recovery completion notification from the incremental update process(or) 606. As already described in the context of FIG. 3, the incremental update process 606 comprises the log reader (not shown here) adapted for reading the recovery log file entries from the recovery log file 604, as well as, the recovery log file applying unit (not shown here) which is adapted for incrementally updating the memory database portion 516 using the respective recovery log file entries from the source database 504. For details refer back to FIG. 3.

In order to manage the process of the here described embodiment successfully, data change statistics should be stored in the persistent metadata catalog comprised in the metadata 608 of the target database system 514 and be maintained when the target database system 514 is updated, i.e., via the incremental update or bulk loading strategy. It may store the following information: (i) timestamp when the update was processed; (ii) schema information of the database tables, e.g., column types, column widths, . . . ; (iii) the amount of data changes per table/table partition that were affected by the update, i.e., inserted records, and deleted records, updated records; and aggregated metrics such as total number of records changed, total data volume that was applied, total execution time of the updates, etc.

The statistics data can be linked to a time interval, e.g., the last x days. Additionally, the statistics data may be managed incrementally as part of each update cycle.

Furthermore, the recovery baseline 610 is also maintained in the persistent metadata 608 (e.g., a metadata catalogue) of the target database system 514. It is required for estimating for determining the data volume that needs to be restored. Therefore, it is not necessary to determine an exact timestamp but interpolating the value is sufficient, e.g.: it may be maintained as heartbeat timestamp that is updated by the target database system in regular time intervals; it may be maintained as starting point of the recovery process after the crash; and it may be maintained as time of last successfully persisted target database snapshot. Thereby, the timestamp may be maintained per table in the target database.

The crash recovery on the target database can be executed as follows: (i) firstly, the next to-be-recovered table/partition is determined; (ii) the data volume that needs to be recovered since the recovery baseline is estimated; (iii) the best recovery strategy is selected based on the estimated data volume and the recovery time is estimated; (iv) then, the recovery of the table with the selected strategy is scheduled; and (v) these steps are repeated in a loop until all data have been recovered.

The estimation of the to-be-recovered data volumes may be executed as follows: (i) for a to-be-recovered table/partition the corresponding data change statistics 612 are looked up; (ii) the recovery baseline for the table/partition is determined; and (iii) the number of changes that need to be replicated via the incremental update process in the interval [recovery baseline, current recovery time] is interpolated.

FIG. 7 shows a block diagram of an embodiment of the linked database system 700 for a crash recovery for linked databases. The linked databases 700 comprise a source database 706 and a related target database 708, wherein selected portions of content of tables of the source database are synchronized with respective portions of the content of the tables of the target database.

The linked database system 700 comprises a processor 702 and a memory 704, communicatively coupled to the processor 702, wherein the memory 704 stores program code portions that, if executed, enable the processor, to synchronize—e.g. using a synchronization unit 714—selected portions of content of tables of the source database 706 with respective portions of content of tables of the target database 708.

The stored program code portions that, if executed, enable the processor 702, to apply—using an applying unit 716—during the synchronizing, changes to the source database 706 to the in-memory target database portion 710 of the database management system comprising the target database, and store persistently—e.g. by storage processor 718—applied changes to the in-memory target database portion 712 asynchronously to a persistent target database storage.

Furthermore, the stored program code portions that, if executed, enable the processor 702 to restore—e.g., by a restore unit 720—upon a database crash on the target database system, the in-memory target database portion 710 with the latest snapshot available in the persistent target database storage portion 712, and apply—e.g. by a second applying unit 722—upon the database crash on the target database system, changes from the source database recovery log file that have a later timestamp than the latest snapshot available in the persistent target database storage portion 712 to the in-memory target database portion 710.

It may also be noted that all modules and units of the linked database system 700 may be electrically interconnected for signal and/or data exchange. This may apply to the processor 702, the memory 704, the source database system 706, the target database system 708 including the in-memory portion 710 and the persistent portion 712, the synchronization unit 714, the applying unit 716, the storage processor 718, the restore unit 720 and the second applying unit 722. Instead of a 1:1 connection between these modules and units they may also be connected to a linked database system internal bus system 724 for signaling data exchange.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the linked database system 700 with crash recovery for linked databases may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell the inventive concept may be summarized in the following clauses:

1. A computer-implemented method for a crash recovery for linked databases, wherein the linked databases comprise a source database and a related target database, wherein selected queries against a database management system comprising the source database are transferred to a database management system comprising the target database for processing, the method comprising, the method comprising synchronizing selected portions of content of tables of the source database with respective portions of content of tables of the target database, applying, during the synchronizing, changes to the source database to an in-memory target database portion of the database management system comprising the target database, and storing persistently applied changes to the in-memory target database portion asynchronously to a persistent target database storage, restoring, upon a database crash on the target database system, the in-memory target database portion with the latest snapshot available in the persistent target database storage, and applying, upon the database crash on the target database system, changes from the source database recovery log file that have a later timestamp than the latest snapshot available in the persistent target database storage to the in-memory target database portion.

2. The method according to clause 1, wherein the synchronizing comprises reading entries of a recovery log file relating to the source database and applying the read entries to the target database.

3. The method according to clause 1 or 2, wherein the source database is optimized for transactions and/or wherein the source database is a row-oriented relational database management system.

4. The method according to any of the preceding clauses, wherein the target database is optimized to analytical operations and or the target database is a column-oriented database.

5. The method according to any of the preceding clauses, also comprising delaying, in case of a crash of the target database, queries against the target database until a recovery of the target database is finished.

6. The method according to any of the preceding clauses, wherein metadata defining the selected tables are part of the recovery log file.

7. The method according to any of the preceding clauses, wherein the storing persistently applied changes comprises waiting until a predefined number of changes have been completed in the in-memory target database portion.

8. The method according to any of the preceding clauses, wherein the restoring of tables of the in-memory target database portion comprises a prioritizing the recovering according to one selected out of the group consisting of a data usage, a query priority and data priority.

9. The method according to clause 8, wherein the prioritizing the recovery according to the data usage comprises maintaining a counter for each table in the target database, the counter value of the counter being indicative of how many queries are waiting for the related table, and restoring firstly the database table with the highest counter value first.

10. The method according to clause 8 or 9, wherein the prioritizing the recovery according to the query priority comprises restoring firstly the database tables receiving queries with the highest priority.

11. The method according to any of the clauses 8 to 10, wherein the prioritizing the recovery according to the data priority comprises maintaining two groups of database tables, each group relating to a separate group of users, and restoring firstly the database tables of the group having a higher configured group priority.

12. The method according to any of the preceding clauses, also comprising determining the data volume to be recovered for a next to be recovered tables, recovering the table using a recovery strategy depending on the volume to be recovered, wherein the recovering strategy is an incremental update strategy or a bulk update strategy.

13. A linked database system with crash recovery for linked databases, wherein the linked databases comprise a source database and a related target database, wherein selected portions of content of tables of the source database are synchronized with respective portions of the content of the tables of the target database, the linked database system comprising, a processor and a memory, communicatively coupled to the processor, wherein the memory stores program code portions that, if executed, enable the processor, to synchronize selected portions of the content of the tables of the source database with respective portions of the content of tables of the target database, apply, during the synchronizing, changes to the source database to an in-memory target database portion of the database management system comprising the target database, and store persistently applied changes to the in-memory target database portion asynchronously to a persistent target database storage, restore, upon a database crash on the target database system, the in-memory target database portion with the latest snapshot available in the persistent target database storage, and apply, upon the database crash on the target database system, changes from the source database recovery log file that have a later timestamp than the latest snapshot available in the persistent target database storage to the in-memory target database portion.

14. The linked database system according to clause 13, wherein the program code portions enable the processor also to read, for the synchronizing, the entries of a recovery log file relating to the source database and applying the read entries to the target database.

15. The linked database system according to clause 13 or 14, wherein the source database is optimized for transactions and/or wherein the source database is a row-oriented relational database management system.

16. The linked database system according to any of the clauses 13 to 15, wherein the target database is optimized to analytical operations and or the target database is a column-oriented database.

17. The linked database system according to any of the clauses 13 to 16, wherein the program code portions enable the processor also to delay, in case of a crash of the target database, queries against the target database until a recovery of the target database is finished.

18. The linked database system according to any of the clauses 13 to 17, wherein metadata defining the selected tables are part of the recovery log file.

19. The linked database system according to any of the clauses 13 to 18, wherein the program code portions enable the processor also to wait, for the storing persistently applied changes, until a predefined number of changes have been completed in the in-memory target database portion.

20. The linked database system according to any of the clauses 13 to 19, wherein the restoring of tables of the in-memory target database portion comprises a prioritizing the recovering according to one selected out of the group consisting of a data usage, a query priority and data priority.

21. The linked database system according to clause 21, wherein the program code portions enable the processor for the prioritizing the recovery according to the data usage also to maintain a counter for each table in the target database, the counter value of the counter being indicative of how many queries are waiting for the related table, and restore firstly the database table with the highest counter value first.

22. The linked database system according to clause 20 or 21, wherein the program code portions enable the processor for the prioritizing the recovery according to the query priority also to restore firstly the database tables receiving queries with the highest priority.

23. The linked database system according to any of the clauses 20 to 22, wherein the program code portions enable the processor for the prioritizing the recovery according to the data priority also to maintain two groups of database tables, each group relating to a separate group of users, and restore firstly the database tables of the group having a higher configured group priority.

24. The linked database system according to any of the clauses 13 to 15, wherein the program code portions enable the processor also to determine the data volume to be recovered for a next to be recovered table, recover the table using a recovery strategy depending on the volume to be recovered, wherein the recovering strategy is an incremental update strategy or a bulk update strategy.

25. A computer program product for a linked database system with crash recovery for linked databases, wherein the linked databases comprise a source database and a related target database, wherein selected portions of content of tables of the source database are synchronized with respective portions of the content of tables of the target database, said computer program product comprising a computer readable storage medium having program instructions embodied therewith, said program instructions being executable by one or more computing systems or controllers to cause said one or more computing systems to a processor and a memory, communicatively coupled to the processor, wherein the memory stores program code portions that, if executed, enable the processor, to synchronize selected portions of content of tables of the source database with respective portions of content of tables of the target database, apply, during the synchronizing, changes to the source database to an in-memory target database portion of the database management system comprising the target database, and store persistently applied changes to the in-memory target database portion asynchronously to a persistent target database storage, restore, upon a database crash on the target database system, the in-memory target database portion with the latest snapshot available in the persistent target database storage, and apply, upon the database crash on the target database system, changes from the source database recovery log file that have a later timestamp than the latest snapshot available in the persistent target database storage to the in-memory target database portion.

What is claimed is:

1. A computer-implemented method for a crash recovery for linked databases, wherein the linked databases comprise a source database and a related target database, wherein selected queries against a database management system comprising the source database are transferred to a database management system comprising the target database for processing, the method comprising:

synchronizing selected portions of content of tables of the source database with respective portions of content of tables of the target database, the source database being a single source to avoid database conflicts, the first database optimized to perform a first task while the target database is optimized to perform a second task, the second task different from the first task;

applying, during the synchronizing of the selected portions of content, changes to the source database to an in-memory target database portion of the database management system comprising the target database, the in-memory target database portion for fast execution of queries;

storing persistently applied changes to the in-memory target database portion asynchronously to a persistent target database storage, the persistent target database portion storing tables and data of the in-memory target database portion for longer-term storage, storing asynchronously allowing the target database to continue without any slowdown in performing the second task;

restoring, upon a database crash on the target database system, the in-memory target database portion with a latest snapshot available in the persistent target database storage, the latest snapshot indicating a last consistent stored status of the target database system; and applying, upon the database crash on the target database system, changes from a source database recovery log file that have a later timestamp than the latest snapshot available in the persistent target database storage to the in-memory target database portion, changes from the source database recovery log file that have a later timestamp indicating database changes which are missing from the latest snapshot.

2. The method according to claim 1, wherein the source database is optimized for transactions.

3. The method according to claim 1, wherein the target database is optimized to analytical operations.

4. The method according to claim 1, also comprising:
delaying, in case of a crash of the target database, queries against the target database until a consistent and updated state has been reestablished in the target database.

5. The method according to claim 1, wherein metadata defining the selected tables are part of the recovery log file, the recovery log file defining an architecture of the in-memory target database.

6. The method according to claim 1, wherein the storing persistently applied changes comprises:
waiting until a predefined number of changes have been completed in the in-memory target database portion, the predefined number of changes used to perform persistent storage changes to the target database when analysis load to the target database is low.

7. The method according to claim 1, wherein the restoring of tables of the in-memory target database portion comprises a prioritizing the recovering according to one selected out of the group consisting of a data usage, a query priority and data priority.

8. The method according to claim 7, wherein the prioritizing the recovery according to the data usage comprises:
maintaining a counter for each table in the target database, the counter value of the counter being indicative of how many queries are waiting for the related table; and
restoring firstly the database table with the highest counter value first.

9. The method according to claim 7, wherein the prioritizing the recovery according to the query priority comprises:
restoring firstly the database tables receiving queries with a highest priority.

10. The method according to claim 7, wherein the prioritizing the recovery according to the data priority comprises:
maintaining two groups of database tables, each group relating to a separate group of users; and restoring firstly the database tables of the group having a higher configured group priority.

11. The method according to claim 1, also comprising:
determining the data volume to be recovered for a next to be recovered tables:
recovering the table using a recovery strategy depending on the volume to be recovered, wherein the recovering strategy is an incremental update strategy or a bulk update strategy.

12. A linked database system with crash recovery for linked databases, wherein the linked databases comprise a source database and a related target database, wherein selected portions of content of tables of the source database are synchronized with respective portions of the content of the tables of the target database, the linked database system comprising:

a processor and a memory, communicatively coupled to the processor, wherein the memory stores program code portions that, if executed, enable the processor, to:

synchronize selected portions of the content of the tables of the source database with respective portions of the content of tables of the target database, the source database being a single source to avoid database conflicts and optimized to perform a first task while the target database is optimized to perform a second task, the second task different from the first task;

apply, during the synchronizing of the selected portions of content, changes to the source database to an in-memory target database portion of the database management system comprising the target database, the in-memory target database portion for fast execution of queries; and store persistently applied changes to the in-memory target database portion asynchronously to a persistent target database storage, the persistent target database portion storing tables and data of the in-memory target database portion for longer term storage, the asynchronous storage allowing the target database to continue without any slowdown in performing the second task;

restore, upon a database crash on the target database system, the in-memory target database portion with a latest snapshot available in the persistent target database storage, the latest snapshot indicating a last consistent stored status of the target database system; and apply, upon the database crash on the target database system, changes from a source database recovery log file that have a later timestamp than the latest snapshot available in the persistent target database storage to the in-memory target database portion, changes from the source database recovery log file that have a later timestamp indicating database changes which are missing from the latest snapshot.

13. The linked database system according to claim 12, wherein the source database is optimized for transactions.

14. The linked database system according to claim 12, wherein the target database is optimized to analytical operations.

15. The linked database system according to claim 12, wherein the program code portions enable the processor also to:

delay, in case of a crash of the target database, queries against the target database until a consistent and updated state has been reestablished in the target database.

16. The linked database system according to claim 12, wherein metadata defining the selected tables are part of the recovery log file, the recovery log file defining an architecture of the in-memory target database.

17. The linked database system according to claim 12, wherein the program code portions enable the processor also to:

wait, for the storing persistently applied changes, until a predefined number of changes have been completed in the in-memory target database portion, the predefined number of changes used to perform persistent storage changes to the target database when analysis load to the target database is low.

18. The linked database system according to claim 12, wherein the restoring of tables of the in-memory target database portion comprises a prioritizing the recovering according to one selected out of the group consisting of a data usage, a query priority and data priority.

19. The linked database system according to claim 18, wherein the program code portions enable the processor for the prioritizing the recovery according to the data usage also to:

maintain a counter for each table in the target database, the counter value of the counter being indicative of how many queries are waiting for the related table; and restore firstly the database table with the highest counter value first.

20. The linked database system according to claim 18, wherein the program code portions enable the processor for the prioritizing the recovery according to the query priority also to:

restore firstly the database tables receiving queries with a highest priority.

21. The linked database system according to claim 18, wherein the program code portions enable the processor for the prioritizing the recovery according to the data priority also to:

maintain two groups of database tables, each group relating to a separate group of users; and restore firstly the database tables of the group having a higher configured group priority.

22. The linked database system according to claim 12, wherein the program code portions enable the processor also to:

determine the data volume to be recovered for a next to be recovered table; and recover the table using a recovery strategy depending on the volume to be recovered, wherein the recovering strategy is an incremental update strategy or a bulk update strategy.

23. A computer program product for a linked database system with crash recovery for linked databases, wherein the linked databases comprise a source database and a related target database, wherein selected portions of content of tables of the source database are synchronized with respective portions of the content of tables of the target database, the computer program product comprising a computer readable storage medium having program instructions embodied therewith, the program instructions being executable by one or more computing systems or controllers to cause the one or more computing systems to:

a processor and a memory, communicatively coupled to the processor, wherein the memory stores program code portions that, if executed, enable the processor, to:

synchronize selected portions of content of tables of the source database with respective portions of content of tables of the target database, the source database being a single source to avoid database conflicts and optimized to perform a first task while the target database is optimized to perform a second task, the second task different from the first task;

apply, during the synchronizing of the selected portions of content, changes to the source database to an in-memory target database portion of the database management system comprising the target database, the in-memory target database portion for fast execution of queries; and store persistently applied changes to the in-memory target database portion asynchronously to a persistent target database storage, the persistent target database portion storing tables and data of the in-memory target database portion for longer-term storage, storing asynchronously allowing the target database to continue without any slowdown in performing the second task;

restore, upon a database crash on the target database system, the in-memory target database portion with a latest snapshot available in the persistent target database storage, the latest snapshot indicating a last consistent stored status of the target database system; and apply, upon the database crash on the target database system, changes from a source database recovery log file that have a later timestamp than the latest snapshot available in the persistent target database storage to the in-memory target database portion, changes from the source database recovery log file that have a later timestamp indicating database changes which are missing from the latest snapshot.

* * * * *